June 30, 1959      F. R. SIMPSON      2,892,408
PRE-ENGRAVED PROJECTILES AND GUN FOR FIRING SAME
Original Filed June 14, 1951      4 Sheets-Sheet 1
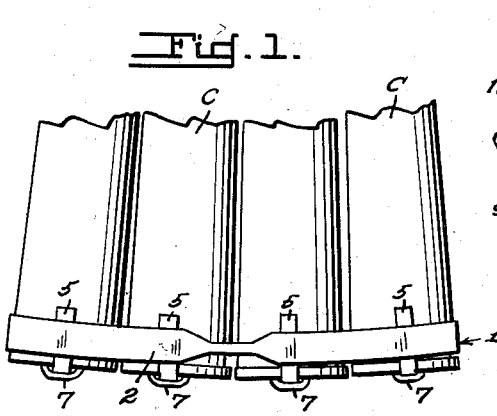
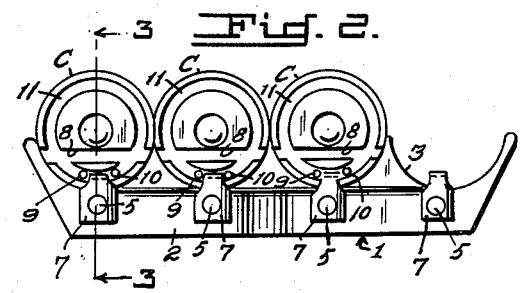
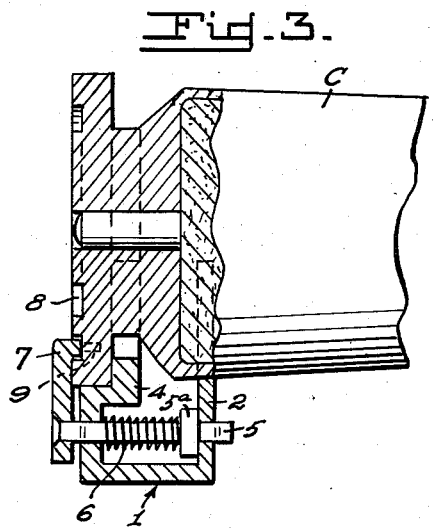
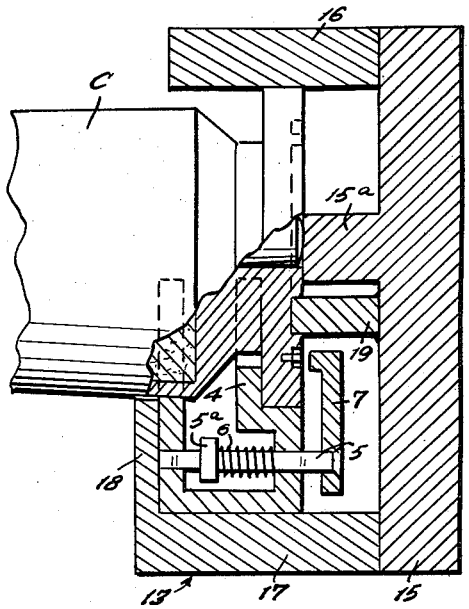
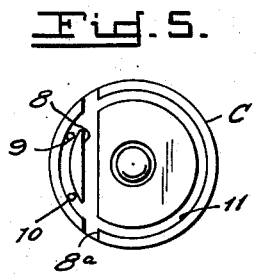
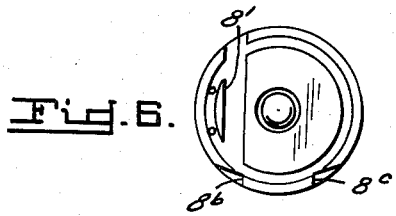
INVENTOR.
Frank R. Simpson June 30, 1959 F. R. SIMPSON 2,892,408
PRE-ENGRAVED PROJECTILES AND GUN FOR FIRING SAME
Original Filed June 14, 1951 4 Sheets-Sheet 2
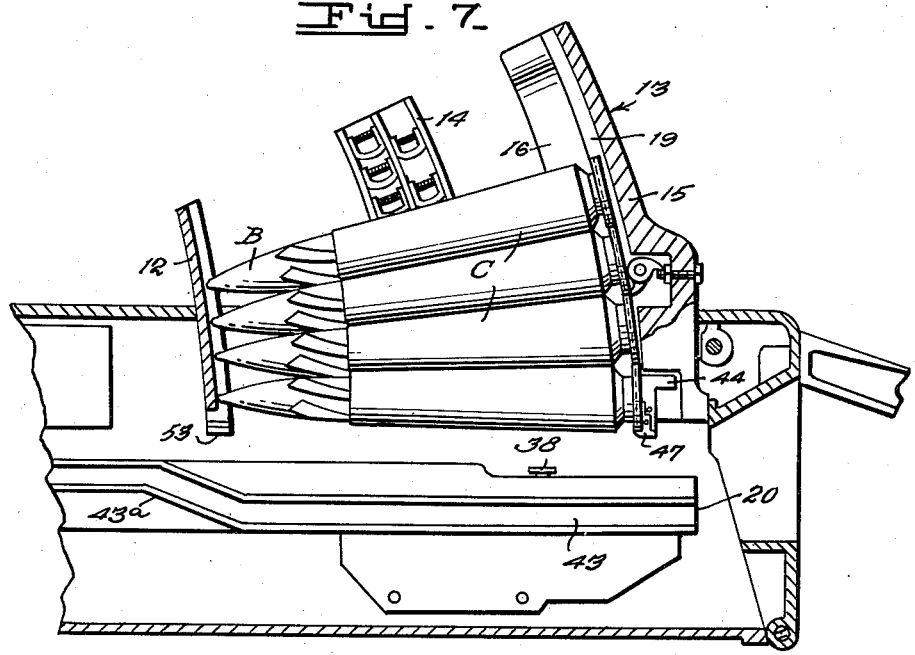
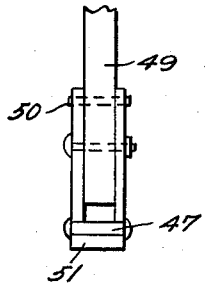
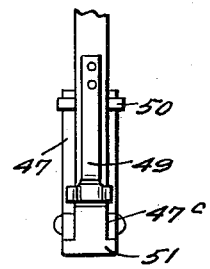
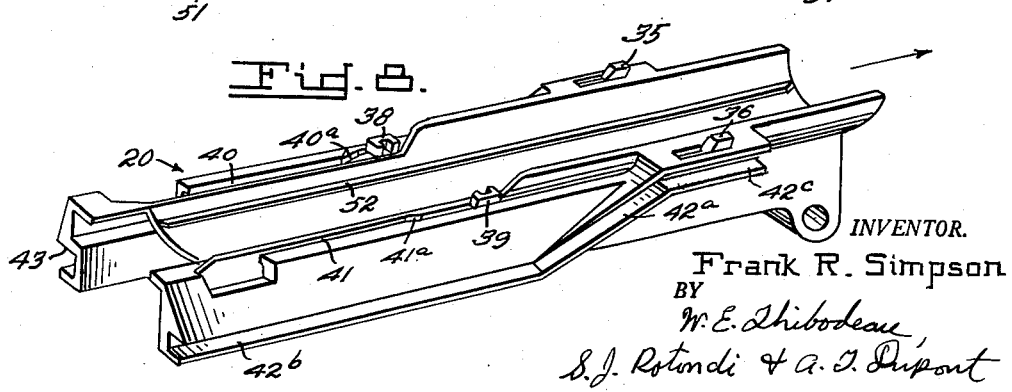
INVENTOR.
Frank R. Simpson June 30, 1959  F. R. SIMPSON  2,892,408
PRE-ENGRAVED PROJECTILES AND GUN FOR FIRING SAME
Original Filed June 14, 1951  4 Sheets-Sheet 3

INVENTOR.
Frank R. Simpson

June 30, 1959   F. R. SIMPSON   2,892,408
PRE-ENGRAVED PROJECTILES AND GUN FOR FIRING SAME
Original Filed June 14, 1951   4 Sheets-Sheet 4
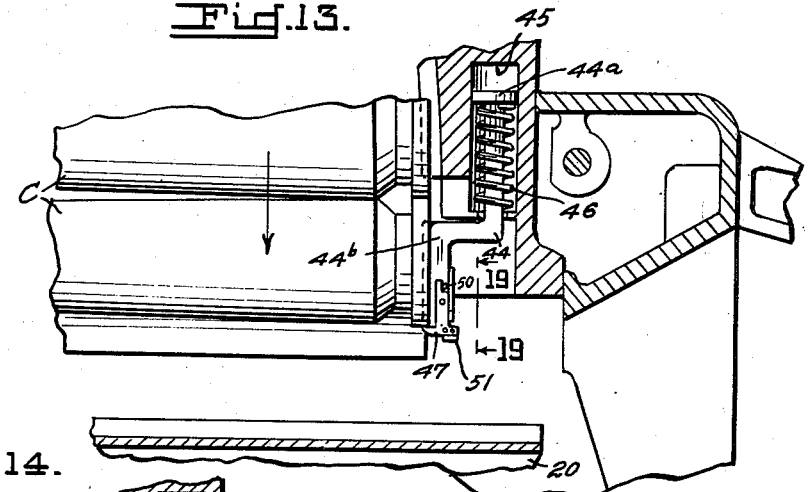
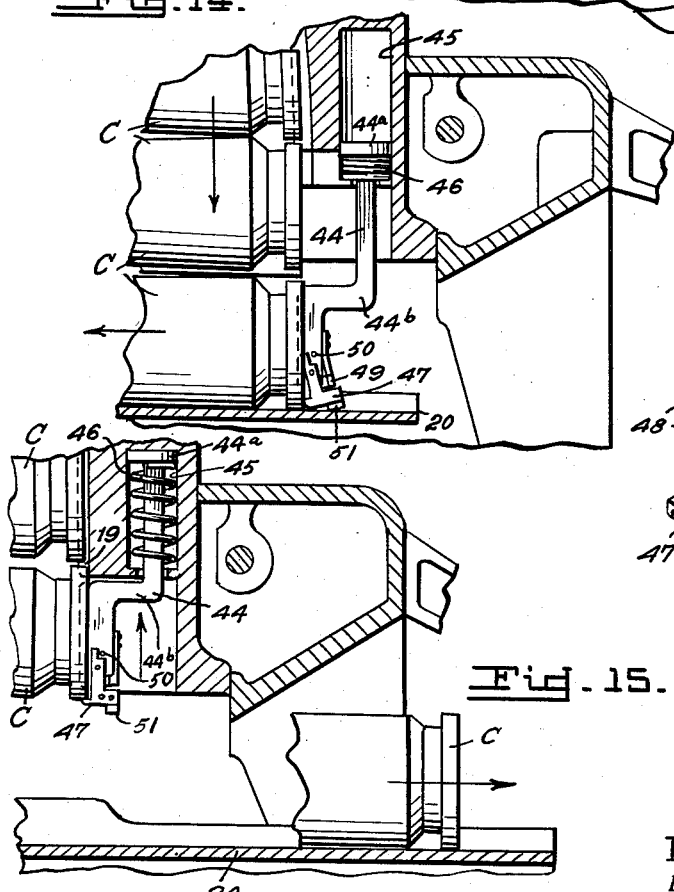
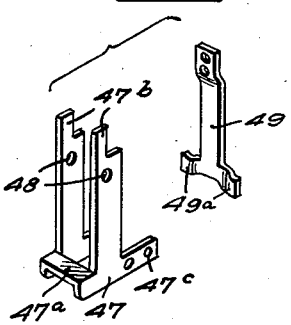
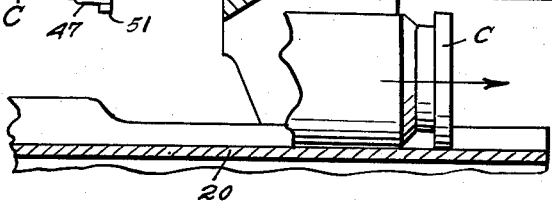
INVENTOR.
Frank R. Simpson
BY W. E. Thibodeau,
S. J. Rotondi & A. J. Dupont

2,892,408

PRE-ENGRAVED PROJECTILES AND GUN FOR FIRING SAME

Frank R. Simpson, Upper Darby, Pa., assignor to the United States of America as represented by the Secretary of the Army Original application June 14, 1951, Serial No. 231,493, now Patent No. 2,804,806, dated September 3, 1957. Divided and this application March 29, 1957, Serial No. 652,640

2 Claims. (Cl. 102—38)

This invention relates to pre-engraved ammunition for use with rifled guns. In the usual fixed round of ammunition, the projectile has a relatively narrow soft metal driving band extending thereabout and rigidly fixed therewith. This band has an outer diameter substantially equal to twice the radial distance from the bore axis of the barrel to the bottom of the grooves of the rifling so that as the projectile is driven along the barrel, its driving band is scored or engraved by the rifling of the barrel and the projectile is constrained to follow the helical rifling and thereby to acquire the necessary stabilizing spin.

The present invention contemplates the use of fixed ammunition or cartridges the projectiles or bullets whereof are pre-engraved, that is, provided with helical splines which initially fit smoothly between the lands of the barrel rifling and create a minimum of friction with the barrel surface, while effecting a substantially gas-tight relation therewith. In an obvious manner, such projectiles reduce wear and friction, increase muzzle velocity for the same propelling charge and increase the useful life of the barrel.

While having great advantages, the use of pre-engraved projectiles in rapid-fire guns, requires that each cartridge be in such a rotational position at the instant it is rammed into the breech, that the splines on its bullet will register or "mesh" accurately with the grooves of the rifling. Otherwise jamming and interference may occur between the engraved projectile and lands of the rifling and impair the operation of the gun.

The foregoing considerations make it desirable that each cartridge be fed to the breech of the gun, with its projectile positively positioned and held in the aforesaid rotational position; and in order to effect this function, I propose to form the base of each cartridge case with indexing means such as a centrally offset notch, groove or lug which will cooperate with the belt or clip as well as with the loading mechanism of the gun, to feed each cartridge into the gun and load it into the breech, in proper rotational position. Then when each cartridge is assembled with its pre-engraved bullet so that its splines bear a certain or predetermined angular relation with the aforesaid indexing means of the cartridge case, proper loading of each cartridge is assured and the benefits and advantages of pre-engraved ammunition are fully exploited.

It is the object of the present invention to provide a clip particularly adapted to hold several rounds of ammunition in side-by-side contacting relation so that each round is held in the desired fixed rotational position until the clip is inserted into the loading mechanism of the gun and engaged thereby in cooperation with the indexing means of the round until the latter is rammed into the gun in the desired "meshing" relation with the rifling.

A further object is to provide a cartridge of the type aforesaid constructed to cooperate with the clip and loading mechanism of the gun to afford the necessary fixed rotational position during feeding to the gun and loading.

Another object is to provide the combination of a clip and plurality of rounds of ammunition which will enable the benefits of pre-engraved ammunition to be realized to the fullest extent.

A still further object is to provide the loading mechanism and tray of a 40 mm. automatic gun, with means co-operating with the cartridge generally and particularly with the aforesaid indexing means of its case, to positively control the rotational position of the cartridge from the time it leaves its clip until it is rammed into the breech with the splines upon its bullet in proper meshing relation with the rifling of the barrel.

Another object is to provide a system or mechanism wherein the rotational position of the cartridge and its indexing means is positively controlled from the time it is loaded into its clip until rammed into the breech of the gun.

Other objects and advantages will be apparent after a study of the following detailed description in connection with the accompanying drawing.

In the drawing:

Figure 1 is a side elevation of a clip holding four cartridges.

Figure 2 is an end elevation of the clip of Figure 1 with one cartridge removed.

Figure 3 is a cross-section to an enlarged scale, taken upon the line 3—3, Figure 2.

Figure 4 is a cross-sectional view of a clip and cartridge in the loader of a 40 mm. automatic gun, taken upon line 4—4, Figure 11, and showing the way in which the cartridges are released from the clip as they are fed downwardly with respect to the loader.

Figure 5 is an end view of a cartridge provided with one type of indexing means.

Figure 6 is an end view of a cartridge provided with a second type of indexing means.

Figure 7 is a sectional view, taken in a vertical axial plane, of a 40 mm. automatic gun and showing portions of the loader and cartridge tray, with means to positively guide the lowermost cartridge into the tray in fixed predetermined rotational position.

Figure 8 is a perspective view of the loading tray showing a longitudinal guide rail thereon for guiding the cartridges in axial translation only, during ramming.

Figure 13 is a vertical section through a portion of the gun showing a special attachment for guiding a round of ammunition in fixed rotational position from the time it leaves the clip until it is deposited by the feed rollers upon the loading tray. In this figure a round has just begun its downward movement from clip to tray.

Figure 14 is a view corresponding to Figure 13 but showing how the attachment is released from the round in response to depositing of the round upon the tray.

Figure 15 is a view corresponding to Figures 13 and 14 but showing the position of the attachment forming a part of the invention when an empty cartridge case is ejected in the direction of the arrow.

Figure 16 is an exploded view of the detent and spring forming portions of the aforesaid attachment; and Figures 17 and 18 are views showing the latch structure in detail.

Figure 9:
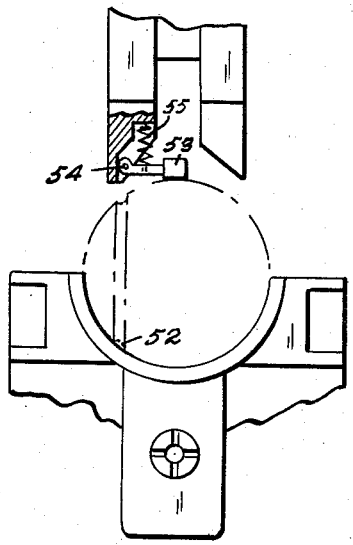
Figure 9 is an end view of the loading tray and a portion of the loader, showing the guide rail in end elevation and a latch in the loader which may be used, if desired, to hold each cartridge with its indexing notch fitting over and about the guide rail during the initial stage of ramming.

Referring in detail to the drawing, 1 indentifies in general a clip adapted to hold four rounds of cartridges and comprising a channel element 2 generally U-shaped in cross-section and having four arcuate notches in its upstanding sides, as indicated at 3, Figure 2. As shown at 4, upon Figure 3, one side wall of the channel element is offset inwardly toward the other side wall, whereby to form a rim or ledge of a minimum depth substantially equal to the width of radial dimension of the flange of the cartridge head. As seen in Figure 1, the clip is slightly curved longitudinally on radii corresponding to those of the automatic loader guides, whereby adjacent rounds remain in contact at their rims as well as at a point near the forward ends of the cartridge cases. See Figure 7.

At each of four points along its length, corresponding to its four most narrow dimensions, the clip is provided with a non-circular rod 5 slidably mounted for longitudinal movement and urged to the right, as viewed in Figure 3, by a spring 6 acting between the wall of the clip and a flange 5a fixed to the rod. In the position shown, the inner end of the rod projects from the clip so that, when forced inwardly against the action of spring 6, a clamp member 7 rigidly attached to the other end of the rod, is moved rearwardly away from the clip to release the rim of the cartridge case C.

The foregoing described construction is standard equipment for the automatic loader of the Army's 40 mm. gun and per se, forms no part of the present invention. When this clip is used with standard ammunition, there is no necessity to locate the rounds within the clip in any particular rotational position. Each round is loaded simply by manual pressure or the end of pin 5, insertion of the round into its nocthes, and release of the pin. The rounds are thus held in the position shown upon Figures 1 to 3, and, together with the clip, are slipped downwardly between the front and rear guides of the automatic loader for firing.

Where pre-engraved ammunition is to be used, I propose to load each round into its clip in the same fixed predetermined rotational position and to include in the automatic loader of the gun itself, means by which the aforesaid rotational position of each round is maintained until it is rammed into the breech. For this purpose, I provide a chordal channel or groove 8 in the head of each cartridge. In addition, the circular groove in the head of each cartridge is provided with a pair of pins 9 and 10 spaced linearly a distance equal to the width of the clamp members 7 and in a direction parallel to grooves or channels 8, as will be clear from inspection of Figures 2 and 5. The pins have a projecting length substantially equal to the depth of the circular groove 11 in which they are positioned so that their ends are flush with the head of the cartridge cases.

Figure 10:
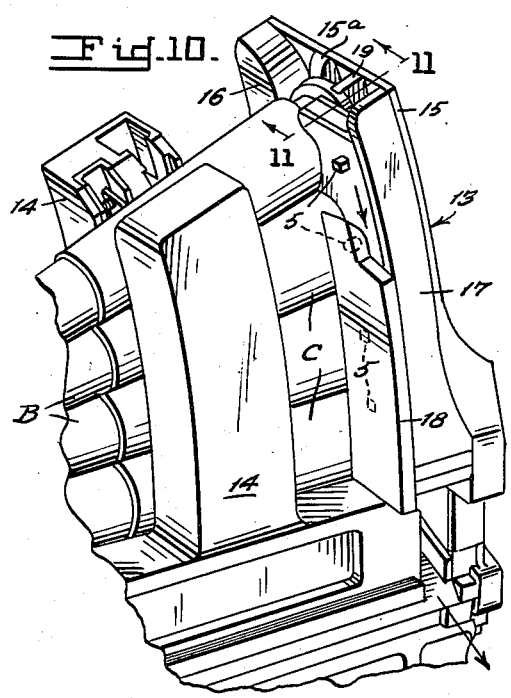
Figure 10 is a perspective view of the rear portions of the automatic loader with a clip of ammunition therein, together with a portion of the loading tray.
Figure 11:
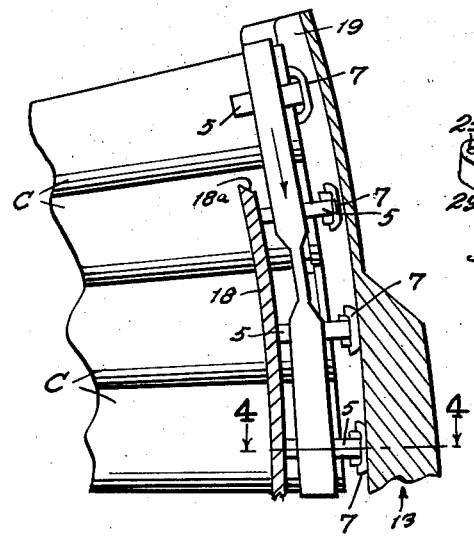
Figure 11 is a sectional view taken in a vertical plane indicated by line 11—11, Figure 10.

Figures 2, 3, 4 and 11 show that the end of each clamp member 7 is turned inwardly to form a lug fitting between the two pins and that when the rounds are so positioned in the clip, the grooves 8 are in alignment in the longitudinal direction of the clip, that is, the direction of movement of the clip and cartridges within the automatic loader of the gun. This automatic loader includes a forward guide 12, Figure 7, having a channel to receive and guide the noses of the splined bullets B, a rear guide 13 to receive and guide the heads of the cartridge cases, and automatic feed mechanism generally indicated at 14, but not shown in detail. In a manner subsequently described, this feed mechanism is operated by movement of the loading tray in recoil and counterrecoil. The forward guide 12 is generally an arcuate upstanding channeled member flaring at its top and adapted to guide the noses of the bullets in downward movement into the gun. The rear guide as shown in Figures 4, 7 and 10, comprises a channeled member having a backing plate 15 and sides 16 and 17 rigidly secured thereto to provide a longitudinally arcuate, generally vertical channel slidably receiving the heads of the cartridges and the clip and guiding them properly when moved downwardly by the feed mechanism 14 of the gun in timed relation with the loading tray, to feed a cartridge thereonto at the proper instant during recoil.

Figure 12:
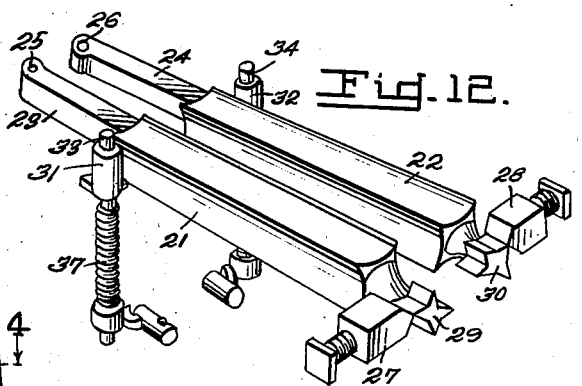
Figure 12 is a perspective view showing the feed rollers and indexing means of a standard 40 mm. automatic gun.

The backing plate 15 is formed with a forwardly and vertically extending ridge 15a which engages the heads of the cartridge within the feeding mechanism and spaces them forwardly a distance sufficient to provide a space enabling clamp members 7 to be moved rearwardly to release the cartridges from the clip as they are moved downwardly in the loader. This release is effected by a cam plate 18 secured to or integral with, side 17, as shown in Figure 4, and having a cam surface 18a, Figure 11, which engages the projecting ends of clip pins 5 as the clip and its cartridges slide downwardly in the loader, and forces the clamp members 7 rearwardly to thereby release the lower cartridges from the clip. In this way, as feed mechanism 14 is operated in response to counterrecoil movement of the barrel and loading tray, to move the cartridges one step downwardly, the lowermost cartridge is forced between the feed rollers 21 and 22, shown at Figure 12, and subsequently described. The feed mechanism of the gun, as just described is of standard construction. In addition, I provide a strip or rail 19 fixed to plate 15, spaced from and parallel to ridge 15a and so positioned and of a length sufficient to engage within the aligned grooves 8 in the cartridge heads during their downward travel in the loader and until the cartridges, in sequence are gripped by the heads of the rammer levers. By this provision the cartridges are maintained in fixed rotational positions from the time they are loaded into the gun with their clip until they are deposited in sequence upon the loading tray 20.

In the gun described, the loading tray is rigidly secured to the breech ring and projects rearwardly therefrom and recoils as a unit therewith. This tray has cam grooves 42 and 43 along its right and left sides, and as the barrel, breech ring and tray move forwardly in counterrecoil, feed rods having rollers at their lower ends riding in the respective cam grooves, are moved downwardly by the grooves to move all cartridges in the loader and their clip, down one step after the empty case of the cartridge previously fired has been ejected. A pair of laterally-shaped, longitudinally-extending feed rollers 21 and 22 are carried by the loading mechanism for positive support of the lowermost cartridge in the loader. These rollers which are in the shape of four-pointed stars in cross section (see Figure 12) are mounted in side-by-side fore and aft relation immediately below the lowermost cartridge in the loader. Each rod is mounted at its forward ends for pivotal movement about a respective axis as indicated at 25 and 26, which axes are parallel, vertical and normal to the axis of rotation of the rollers, whereby the separation of the rollers may vary. This separation is yieldingly resisted by spring-pressed indexing plungers 27 and 28 engaging respective star index wheels 29 and 30 each rigidly attached to a respective feed roller. The relation of the plungers, index wheels and feed rollers is such that the latter are yieldingly held in position conjointly forming an upwardly-facing semi-circular channel into which the lowermost cartridge is forced by the feed mechanism. This movement forces the feed rollers and index wheels to rotate one-quarter rotation and insures that but one cartridge may be deposited upon the feed tray for each reciprocation thereof in recoil and counterrecoil. The pivotal mounting of the feed roller shafts enables the rollers to separate slightly and continuously grip a cartridge as it passes therebetween. The rollers are normally locked in position by catch heads 31 and 32 mounted upon respective spindles 33 and 34. During counterrecoil, when the cartridges are being depressed by the feed mechanism to deposit the lowermost cartridge upon the tray, the loading tray pawls 35 and 36, Figure 8, engage and rotate the catch heads. This action releases the feed rollers and permits them to be revolved by the cartridge in the manner previously described. When the cartridge has passed between the feed rollers and the rollers have rotated one-quarter turn, the catch heads are returned to their normal positions by torsion springs such as 37, shown in Figure 12 for catch 31. This again locks the rollers in position until released by the next reciprocation of the tray.

The upper ends of the rammer levers are indicated at 38 and 39, Figure 8. These levers are independently pivoted on a common rammer rod (not shown), as the gun and tray move in counterrecoil toward battery position. The rammer levers project upwardly through respective cam slots 40 and 41 in the loading tray. These slots have oppositely-disposed "riser" portions 40a and 41a each connecting straight parallel portions at different transverse distances from the central longitudinal axis of the tray. As previously described the automatic feed mechanism is operated by rollers not shown, riding in respective cam slots or channels 42 and 43 formed upon the tray 20. See Figures 7 and 8. These slots have riser portions 42a and 43a, each connecting two parallel sections, such as 42b and 42c and act to raise the feed pawls during recoil and then to lower them at the proper time during counterrecoil to effect the aforementioned downward feeding of the cartridges and to move the lowermost cartridge between feed rollers 21 and 22, and to deposit it upon the tray.

Forward movement of the tray with the gun barrel in counter recoil acts to tension a rammer spring, not shown, which then acts to urge the rammer arms forwardly in their slots 40 and 41. The active or "riser" portions 40a and 41a of slots 40 and 41 are so positioned longitudinally of the tray, with respect to the active portions 42a and 43a of channels 42 and 43, that the upper ends of rammer levers 38 and 39 are moved inwardly toward each other at the instant the feed mechanism is operated to deposit a cartridge upon the tray. At that instant, of course, the rim or head of the deposited cartridge is coplanar with the rammer levers so that as the rammer levers move toward each other they grip the head of the cartridge between them. At this time the rammer levers are latched in rearwardmost position while the gun and tray are moving in counterrecoil toward battery position. The breechblock of the gun is, of course, fully open.

As the barrel and tray near battery position loading tray pawls 35 and 36 trip the catch holding the rammer lever and arms 38 and 39 in retracted position and the now-compressed rammer spring throws the arms and the cartridge gripped between them, forwardly at extremely high speed. As the arms move forwardly past the riser or active portion 40a of their slots, they are separated. The cartridge is released and moves forward under its own momentum into the breech. Movement of the cartridge into the breech releases the breechblock in a well-known manner which, on closing, fires the gun when in automatic fire.

In view of the fact that there might otherwise be a short period after the cartridge leaves guide strip 19 until it is gripped by rammer levers 38, 39 and otherwise held in rotational position upon the tray, I have provided a detent mechanism which, in effect, forms a continuation of strip 19 and moves downwardly with the cartridge until the latter is gripped by the rammer levers.

This detent or guide mechanism comprises a plunger element 44 having a head 44a slidably fitting a bore 45 formed in the loader frame. The plunger is limited to reciprocation only and is urged upwardly by a coil spring 46 into the normal position shown upon Figure 15. The plunger element has a forwardly-offset end portion 44b. This portion has its forward vertical edge so shaped and normally positioned to form a continuation of guide strip 19, as will be noted from Figure 15, whereby the rotational position of the lowermost cartridge is controlled only by the detent or guide mechanism by reason of its engagement within the indexing groove in the cartridge head.

A latch generally indentified by the numeral 47 in Figures 13, 14 and 15, and shown in greater detail upon Figures 16, 17 and 18, is carried by the lower end of offset portion 44b. The latch may conveniently have the general form shown upon Figure 16, pivoted to the plunger on a transverse axis defined by aligned holes 48 and urged into clockwise rotation as viewed in Figures 13, 14 and 15, by a leaf spring 49 having forwardly offset lateral projections 49a. These projections engage the respective side walls of latch 47 and urge the same into a rotation position wherein the nose portion 47a projects forwardly into a position to be engaged by the rim of the lowermost cartridge, as shown by Figure 15. Rotation of the latch is limited to the position shown on Figures 13 and 15 by engagement between the edges of projections 47b, with the ends of a pin 50 having a press fit within a transverse bore in plunger 44. The base of the latch has rearwardly-projecting arms 47c, Figure 16, to and between which there is secured an anti-friction block 51, Figures 17 and 18. This block projects below the lower edges of the arms 47c and, being rearwardly offset from the axis of holes 48 pivots the latch counterclockwise when moved into contact with the surface of loading tray 20.

By the construction just described, as the lowermost cartridge is forced downwardly by the feed mechanism, in the manner previously described, its engagement with nose 47a of latch 47, causes the entire plunger element to move downwardly as a unit with the cartridge until, when block 51 strikes the loading tray, the latch 47 is pivoted to remove nose 47a from the rim of the cartridge. Whereupon, spring 46 causes the entire plunger element to snap back into the position shown in Figure 15 wherein the forward edge of portion 44b engages within the indexing groove 8 of the next cartridge.

It will thus be seen that the construction just described maintains each cartridge, as it is fed downwardly from the feed mechanism to the loading tray, in fixed rotational position and acts to maintain such position until the cartridge rests upon the tray and is engaged by the rammer arms as previously described.

It is contemplated that the rammer levers alone may be sufficient to maintain the cartridge in proper rotational position upon the loading tray until it is released therefrom by the action of the active or "riser" portions 40a and 41a of slots 40 and 41, and thrown forwardly at high velocity into the breech. However in addition to the gripping action of the rammer levers, I provide a guide rail 52, rigidly secured to the loading tray longitudinally thereof and so positioned and shaped as to engage within the notch in the rim of the cartridge case, such as 8a, Figure 5. This guide rail is in the same longitudinal vertical plane as guide strip 19 so that, as the lowermost cartridge in the loader or magazine is guided downwardly without rotation, the notch in the rim of its head fits over and engages the rail. This acts to prevent angular movement of the cartridge during the instant its rim is gripped by the rammer levers. As the guide rail extends throughout the length of the loading tray, as shown upon Figure 8, the correct angular position of the cartridge is maintained after it has been released by portions 40a and 41a of the cam slots as the rammer rod and its arms are moved forwardly relatively to the tray. The cartridge is thus positively guided to prevent its rotation or angular movement about its longitudinal axis from the time it is loaded into the magazine or loader, until it is rammed into the breech with the splines of its bullet in proper registration with the rear terminals of the rifling grooves of the barrel.

Due to the high speed with which the cartridge is rammed into the breech, and with which the empty case is thrown rearwardly by the extractors, it is desirable to provide some means for exerting a downward force upon the cartridge during its forward movement with and also relatively to, the tray, as well as during the rearward movement of the empty cartridge case. For this purpose, I have provided a yielding or flexible detent 53, Figures 7 and 9. This detent is pivoted at one end, as indicated at 54, Figure 9, on a longitudinal axis and is urged into clockwise rotation, as viewed, by a spring 55. The detent is positioned on the automatic loader just beneath and forwardly of the front cartridge guide 12 so that the nose of each cartridge just clears the same as it is fed downwardly onto the tray. The detent is limited in downward pivotal movement, by any suitable stop mechanism, not shown, to substantially the position shown upon Figure 9. Hence, as the cartridge is moved forwardly, the nose of its bullet passes beneath the detent and pivots the same upwardly against the force of spring 55. The detent thus exerts a downward force upon the cartridge which prevents it from bouncing upon the tray. As the empty cartridge case is thrown rearwardly by the extractors, its rim again cams detent 53 slightly upwardly whereby the empty case is held with the notch in its head fitting over rail 52 so that the correct rotational position of the empty case is maintained until it is clear of he gun.

When cartridges having index means of the type shown upon, Figure 6 are used, it is contemplated that the loading tray will be provided with two spaced parallel guide rails similar to rail 52, each position to fit a respective notch 8b and 8c in the cartridge rim, thus affording added protection against axial rotation of the cartridge and empty case.

I have thus provided a complete system particularly adapted for the automatic gun described wherein pre-engraved ammunition may be used without danger of jamming and the great benefits and advantages thereof utilized and exploited to the fullest extent. Any minor rotational misalignment between the cartridge and the rifling at the breech will be corrected by the tapered or pointed ends of the splines upon the bullet, as indicated upon Figure 7 and as described in my United States Letters Patent No. 2,659,262, issued November 17, 1953, wherein is disclosed and claimed an apparatus for assembling pre-engraved bullets in proper predetermined angular relation with respect to the indexing slot and for notches upon the head of the cartridge case.

In the claims, the term "indexing means" comprehends the slot 8 or 8' as shown in Figures 5 and 6 respectively, and at least one notch in the cartridge rim, such as 8a, Figure 5, or 8b or 8c, Figure 6. The term "meshing relation" means an angular or rotational position of the cartridge with respect to the breech wherein the splines upon the preengraved projectile of the cartridge will freely enter between the lands of the rifling of the barrel at the breech end thereof, by a straight axial translation of the cartridge and without any substantial rotation thereof. By "ramming position" is meant a position of the cartridge rearwardly of the breech and in axial alignment with the bore of the gun whereby loading into the breech may be effected by a pure axial translation of the cartridge. The term "transverse" as applied to the groove or channel in the head of the cartridge case, means at right angles to the central longitudinal axis of the cartridge.

Having now fully disclosed the invention, what I claim and desire to secure by Letters Patent is:

1. In a cartridge including a cylindrical case having a circular groove in its head and a pre-engraved projectile secured in and closing the forward end of said case, indexing means for said projectile comprising a chordal channel in said head, and means securing said projectile in indexed position comprising a pair of engagement pins fixed in said circular groove and spaced in a linear direction in said groove in a direction parallel to said channel, said pins having a projecting length substantially equal to the depth of said circular groove.

2. In a fixed round of ammunition, a cylindrical case having a circular groove in its head, said groove defining a rim portion therein a projectile having helical splines secured in and closing the forward end of said case, said splines being beveled at their forward ends thereof, indexing means for said projectile on said case comprising a centrally offset transverse channel in its head thereof, there being at least one notch in said rim portion, and means for the securement of said projectile in indexed relation comprising a pair of engagement pins fixed in the floor of said circular groove and spaced in a linear direction parallel to said transverse channel and projecting to a length substantially equal to the depth of said circular groove, said transverse channel, said notch and said projectile having a predetermined fixed angular relation with respect to the central longitudinal axis of said cylindrical case.

References Cited in the file of this patent
UNITED STATES PATENTS

| | | |
|---|---|---|
| 683,384 | Cole | Sept. 24, 1901 |
| 2,630,067 | McWhorter | Mar. 3, 1953 |